United States Patent
Pita-Gil et al.

(10) Patent No.: US 12,345,808 B2
(45) Date of Patent: Jul. 1, 2025

(54) METHOD FOR DETECTING A TRAFFIC CONGESTION SITUATION IN A MOTOR VEHICLE

(71) Applicants: RENAULT S.A.S., Boulogne-Billancourt (FR); NISSAN MOTOR CO., LTD., Yokohama (JP)

(72) Inventors: Guillermo Pita-Gil, Versailles (FR); Salim Zair, Massy (FR)

(73) Assignees: Ampere S.A.S., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 346 days.

(21) Appl. No.: 17/996,307

(22) PCT Filed: Mar. 22, 2021

(86) PCT No.: PCT/EP2021/057192
§ 371 (c)(1),
(2) Date: Oct. 14, 2022

(87) PCT Pub. No.: WO2021/209225
PCT Pub. Date: Oct. 21, 2021

(65) Prior Publication Data
US 2023/0204762 A1  Jun. 29, 2023

(30) Foreign Application Priority Data
Apr. 16, 2020 (FR) ...................................... 2003851

(51) Int. Cl.
*G01S 13/931* (2020.01)
*G01S 7/41* (2006.01)
*G01S 13/52* (2006.01)

(52) U.S. Cl.
CPC ............. *G01S 13/931* (2013.01); *G01S 7/411* (2013.01); *G01S 13/52* (2013.01); *G01S 2013/93271* (2020.01); *G01S 2013/93272* (2020.01); *G01S 2013/93274* (2020.01)

(58) Field of Classification Search
CPC ........ G01S 13/931; G01S 7/411; G01S 13/52; G01S 2013/93274; G01S 2013/93271; G01S 2013/93272
See application file for complete search history.

(56) References Cited

U.S. PATENT DOCUMENTS

| | | | |
|---|---|---|---|
| 2007/0219720 A1* | 9/2007 | Trepagnier | G05D 1/024 |
| | | | 701/300 |
| 2013/0103296 A1 | 4/2013 | Koshizen et al. | |
| 2013/0268152 A1 | 10/2013 | Koshizen et al. | |
| 2016/0039411 A1* | 2/2016 | Park | G01S 13/931 |
| | | | 701/70 |
| 2017/0116851 A1* | 4/2017 | Burke | G08G 1/0129 |
| 2018/0231637 A1* | 8/2018 | Thompson | G01S 13/06 |
| 2019/0120951 A1* | 4/2019 | Fischer | B60W 30/08 |
| 2019/0163180 A1 | 5/2019 | Patel et al. | |
| 2020/0011966 A1 | 1/2020 | Vermersch et al. | |

OTHER PUBLICATIONS

International Search Report issued Jun. 11, 2021 in PCT/EP2021/057192, filed on Mar. 22, 2021, 2 pages.
French Preliminary Search Report issued Dec. 9, 2020 in French Application 20 03851, filed on Apr. 16, 2020, (with English Translation of categories of Cited Documents & Written Opinion).

* cited by examiner

*Primary Examiner* — Bernarr E Gregory
*Assistant Examiner* — Hailey R Le
(74) *Attorney, Agent, or Firm* — Oblon, McClelland, Maier & Neustadt, L.L.P.

(57) ABSTRACT

Method for detecting traffic congestion using a motor vehicle radar system, comprising multi-beam radar sensors (21-24) in the rear and front corners of the vehicle, the method comprising the steps of: dividing the radar sensors (Df_l, Df_r, Dr_l, Dr_r) into four angular sectors (Zfront, Zrear, Zleft, Zright) extending to the front, to the rear, to the right and to the left of the vehicle respectively, —selecting for each angular sector, from the beams for which no target is detected, the (Dfront, Drear, Dleft, Dright) beam having the shortest reach distance, —detecting the amplitude of reflected beams corresponding respectively to the selected beams, and—analysing the period during which the amplitude of the reflected beams is maintained relative to a predefined time threshold for each angular sector respectively, the method detecting a traffic congestion situation when the analysing step determines simultaneously for the four angular sectors that the period during which the amplitude of the reflected beams is maintained is greater than or equal to the predefined time threshold.

12 Claims, No Drawings

METHOD FOR DETECTING A TRAFFIC CONGESTION SITUATION IN A MOTOR VEHICLE

The present invention relates to the field of the autonomous driving of an automobile vehicle on a highway. It relates more particularly to a method for detecting a traffic congestion situation by an automobile vehicle.

In the framework of an autonomous driving mode of OICA (acronym for "Organisation internationale des Constructeurs Automobiles") level 3, the driver does not carry out any of the operational driving tasks, such as acceleration, braking or the manipulation of the steering wheel, which are thus delegated to the control system in autonomous mode of the vehicle, which provides the complete control of the vehicle. The driver is therefore authorized not to hold the steering wheel in order to perform other tasks in parallel, such as for example watching a movie on a screen of his/her vehicle. However, the autonomous driving of level 3 has a limited range of operation and can only take place under certain environmental and traffic conditions. In particular, level 3 autonomy can only be activated for speeds below 60 km/h on divided highways, typically freeways, and in a traffic congestion situation. It is relatively straightforward to verify the conditions of activation of this level of autonomy which are linked to the positioning of the vehicle on a divided highway and to the non-exceeding of the speed threshold of 60 km/h, notably by means of the navigation system and of the onboard sensors used to measure the speed of the vehicle. In contrast, it is much more complex to evaluate whether the vehicle is in a congested driving situation. It is considered that the vehicle is in a congested driving situation if it is "surrounded" in front, behind, and also on its left and right sides, by vehicles or obstacles, such as walls or barriers, in other words, if the vehicle is restricted in its near environment in all directions by other vehicles or obstacles.

For this purpose, sensors for detection of obstacles emitting a wave which is reflected on the surface of the objects located in the direction of propagation are used. The comparison of the incident wave with its echo allows a propagation time, a phase-shift or a potential frequency shift to be estimated, which subsequently supplies the distance separating the sensor from the surface of the object forming the echoes. The type of sensor the most widely used for automobile applications is radar. The principle of radar is based on the emission of an electromagnetic wave and the receipt of the echo formed by this wave on a surface in order to estimate the distance to this surface. Furthermore, if the reflecting object is travelling at a certain speed relative to the radar, the reflected wave will have a frequency substantially different from that of the incident wave, which allows a measurement of the relative speed between the radar and the reflecting object to be obtained. However, radar has a certain number of limitations. In particular, the analysis of the radar data reveals numerous spurious echoes on the road or on the road verges. Accordingly, in order to avoid this causing a large number of false detections, static objects are generally filtered by comparing the measurement of their speed with the speed of the equipped vehicle. Thus, a stationary vehicle will not be detected. In other words, immobile objects are "invisible" for the radar. This aspect represents a significant stumbling block to the deployment of the autonomous driving mode with a level 3 autonomy, because this autonomous driving mode of the vehicle can only be activated in a traffic congestion situation, whereas precisely the most typical case of such a situation, corresponding to all the surrounding vehicles being stationary, is not detected by the radar systems equipping the host vehicle. The availability of level 3 autonomous driving is consequently severely limited.

The patent document WO201202099 describes a device for estimating the congestion of the traffic designed to warn the driver of a dangerous situation on the road. The device comprises a speed detection unit configured for detecting the speed of a host vehicle, a distance detection unit configured for detecting an inter-vehicle distance between the host vehicle and another vehicle, a computer configured for calculating a correlation on the basis of the result of the detection of speed and of the detection of distance between vehicles, and a unit for estimating the state of the traffic on the basis of the result of the correlation calculation.

Although based on the principle of the division of the radar beams into angular sectors, the independent analysis of each sector and the combination of the detection data for estimating the state of the traffic, this solution does not seemingly implement a filtering of the immobile objects. Accordingly, it requires the use of high-end radar sensors capable of also detecting surrounding objects with a speed of zero.

This solution is not therefore totally optimized and there exists therefore a need for an improved solution allowing the performance and the robustness of the detection of a traffic congestion situation to be improved at a lower cost.

For this purpose, the invention relates to a method for detecting a traffic congestion situation with the aid of a radar system equipping a host automobile vehicle, said radar system comprising multi-beam radar sensors arranged at the rear and front corners of the host vehicle, the radar beams of each radar sensor being emitted in various given targeted directions in such a manner as to cover, for each radar sensor, a detection zone extending between a radial direction oriented obliquely toward the front and a radial direction oriented obliquely toward the rear, each radar sensor being capable of supplying, for each given targeted direction, the range of the radar beam emitted in said direction, the method being characterized in that it comprises steps for:

distributing all of the emitted radar beams by the radar sensors according to a division of the environment of the vehicle into four angular sectors, in opposing pairs, respectively extending toward the front and toward the rear of the vehicle and toward the right side and toward the left side of the vehicle, for each of the four angular sectors, from amongst the beams distributed into each of them for which no target is detected, selecting the beam having the shortest range, detecting the amplitude of the reflected beams corresponding respectively to said beams selected within the four angular sectors, and analyzing the period of time during which the amplitude of said reflected beams is maintained with respect to a time threshold predefined for each angular sector respectively, the method detecting a traffic congestion situation when the analysis step determines, simultaneously for the four angular sectors, that said period of time for which the amplitude is maintained is greater than or equal to said predefined time threshold.

By virtue of this combination of steps, it is possible to detect a traffic congestion situation by means of the radar sensors, even when the surrounding vehicles are stationary.

Advantageously, the analysis step furthermore comprises a step for comparing the range of each beam selected within the four angular sectors with a predefined distance threshold for each angular sector respectively, the method detecting a traffic congestion situation when the comparison step simultaneously determines for the four angular sectors that said range is less than or equal to said predefined distance threshold.

Preferably, said predefined distance threshold is fixed at less than or equal to 5 m, preferably equal to 3 m, for the angular sectors extending toward the front and toward the rear of the host vehicle.

Preferably, said predefined distance threshold is fixed at less than or equal to 2 m, preferably equal to 1.5 m, for the angular sectors extending on the right side and on the left side of the host vehicle.

Advantageously, the method comprises a step for activating an autonomous driving mode of the host vehicle when a traffic congestion situation is detected.

Advantageously, said autonomous driving mode is designed to provide all of the operational driving tasks of the host vehicle.

The invention also relates to a device for detecting a traffic congestion situation comprising a radar system on board a host automobile vehicle, said radar system comprising multi-beam radar sensors arranged at the rear and front corners of said vehicle, the radar beams being emitted in various given targeted directions in such a manner as to cover, for each radar sensor, a detection zone extending between a radial direction oriented obliquely toward the front and a radial direction oriented obliquely toward the rear, each radar sensor being capable of supplying, for each given targeted direction, the range of the radar beam emitted in said direction, the device being characterized in that it comprises a unit for processing the emitted radar beams, designed to apply a distribution of all of the radar beams emitted by the radar sensors according to a division of the environment of the vehicle into four angular sectors, in opposing pairs, extending respectively toward the front and toward the rear of the vehicle and toward the right side and toward the left side of the vehicle, and to select, for each of said four angular sectors, from amongst the beams distributed into each of them for which no target is detected, the beam having the shortest range, said processing unit comprising an analysis module designed to verify the period of time for which the amplitude of the reflected beams, corresponding respectively to said beams selected within the four angular sectors, is maintained with respect to a predefined time threshold for each angular sector respectively, said device detecting a traffic congestion situation when said analysis module determines, simultaneously for the four angular sectors, that said period of time for which the amplitude is maintained is greater than or equal to said predefined time threshold.

Advantageously, the device furthermore comprises a module for comparing the range of each beam selected within the four angular sectors with a predefined distance threshold for each angular sector respectively, the device detecting a traffic congestion situation when the comparison module determines, simultaneously for the four angular sectors, that said range is less than or equal to said predefined distance threshold.

Advantageously, the device furthermore comprises a module for comparing the range of each beam selected within the four angular sectors with a predefined distance threshold for each angular sector respectively, the device detecting a traffic congestion situation when the comparison module determines, simultaneously for the four angular sectors, that said range is less than or equal to said predefined distance threshold.

Advantageously, the device comprises means for activating a system for controlling the autonomous mode of the vehicle when a traffic congestion situation is detected.

The invention furthermore relates to an automobile vehicle characterized in that it comprises a device such as described hereinabove.

Other features and advantages of the invention will become more clearly apparent from its description presented hereinafter, by way of non-limiting example, with reference to the appended drawings in which:

FIG. 1 is a schematic top view illustrating the implementation of the method according to the invention.

FIG. 2 illustrates schematically one embodiment of a unit for processing the emitted radar beams, for the implementation of the method of the invention.

In the present description, the terms front, rear, right, left are denoted with respect to the front and rear directions of the vehicle and with respect to the normal direction of travel of this vehicle.

With reference to FIG. 1, this illustrates an object detection system installed on a host automobile vehicle 10. The object detection system comprises four object detection sensors arranged at the four corners of the vehicle, respectively a front left corner sensor 21, a front right corner sensor 22, a rear left corner sensor 23 and a rear right corner sensor 24. These corner sensors are for example positioned at the lateral ends of a face of the front and rear fenders of the vehicle. These object detection sensors 21-24 may for example be radar sensors and, in particular, multi-beam radar sensors designed to emit radar beams in various given targeted directions in such a manner that each radar sensor 21-24 can scan a detection zone extending over a given angular range, for example of substantially 180°, between a radial direction oriented obliquely toward the front and a radial direction oriented obliquely toward the rear. The detection zone of each radar sensor 21-24 has substantially the shape of a semi-circle.

The detection zone of the radar sensor 21 disposed on the front left corner extends over an angular range of substantially 180° bounded between a radial direction oriented obliquely toward the front right and a radial direction substantially opposite, oriented obliquely toward the rear left, such that the detection zone covered by the radar sensor 21 disposed on the front left corner extends over the front of the vehicle and the left side of the vehicle.

Similarly, the detection zone of the radar sensor 22 disposed on the front right corner extends over an angular range of substantially 180° bounded between a radial direction oriented obliquely toward the front left and a radial direction oriented obliquely toward the rear right, such that the detection zone covered by the radar sensor 22 disposed on the front right corner extends over the front of the vehicle and the right side of the vehicle.

Similarly again, the detection zone of the radar sensor 23 disposed on the rear left corner extends over an angular range of substantially 180° bounded between a radial direction oriented obliquely toward the front left and a radial direction oriented obliquely toward the rear right, such that the detection zone covered by the radar sensor 23 disposed on the rear left corner extends over the rear of the vehicle and the left side of the vehicle.

Lastly, the detection zone of the radar sensor 24 disposed on the rear right corner extends over an angular range of substantially 180° bounded between a radial direction oriented obliquely toward the front left and a radial direction oriented obliquely toward the rear right, such that the detection zone covered by the radar sensor 24 disposed on the rear right corner extends over the rear of the vehicle and the right side of the vehicle.

Thus, the corner radar sensors 21-24 are capable of detecting objects in the environment of the vehicle both on the right and left sides of the vehicle and on the front and the rear of the vehicle.

The detection zones of the radar sensors disposed on the front left and right corners partially overlap on the front of the vehicle, the detection zones of the radar sensors disposed on the front left and rear left corners partially overlap on the left side of the vehicle, the detection zones of the radar sensors disposed on the rear left and right corners partially overlap on the rear of the vehicle and the detection zones of the radar sensors disposed on the rear right and front right corners partially overlap on the right side of the vehicle.

Each radar sensor 21-24 emits beams of electromagnetic waves, respectively $D_{f\_l}$, $D_{f\_r}$, $D_{r\_l}$, $D_{r\_r}$, in a given targeted direction of space, in such a manner as to cover the corresponding detection zone of the radar sensor. When a radar beam encounters an object situated in the detection zone the beam is reflected. By measuring the time of flight (time needed for the beam to go from the radar sensor to the object then to return), the distance between the sensor and the object is determined. Furthermore, if the reflecting object is moving at a certain speed, the resulting shift in frequency between the emitted beam and the reflected beam allows a measurement of the speed of the reflecting object to be obtained.

Thus, the detection system installed on the host vehicle allows detection information to be received relating to an assembly of mobile objects positioned inside of the detection zones of the radar sensors of the detection system. In particular, the distance between an object and the radar sensor and the speed of an object are associated with each mobile object detected.

In contrast, as explained in the introduction, when an object is immobile, it is not detected by the radar sensor. However, each radar sensor supplies, for each radar beam emitted in a given targeted direction, a distance to which its beam reaches if it does not detect a target, either the emitted beam does not encounter any obstacle, or it encounters an obstacle, but this is an immobile obstacle, not therefore generating any detection information. Accordingly, this distance to which the beam reaches if it does not detect a target may be either the maximum range to which the emitted radar beam reaches, corresponding to the case where it does not encounter any obstacle, or the distance at which the emitted radar beam encounters an obstacle, corresponding to the case of an immobile obstacle, without it being possible, in the absence of a detection, to distinguish between these various possible cases.

Accordingly, rather than exploiting detection information resulting from the encounters of a radar beam with a mobile object situated in the detection zone, the method of the invention exploits the information relating to the range of the beams by targeted direction when the emitted beam does not detect any target, in order to allow an immobile object to be detected in the environment of the vehicle, typically a stationary vehicle, or a barrier running along the roadside.

For this purpose, in a first step, a distribution of all of the radar beams $D_{f\_l}$, $D_{f\_r}$, $D_{r\_l}$, $D_{r\_r}$, emitted by the radar sensors 21-24, is carried out according to a division of the environment of the vehicle 10 into four angular sectors $Z_{front}$, $Z_{rear}$, $Z_{left}$, $Z_{right}$, these angular sectors being in opposing pairs and respectively extending toward the front and toward the rear of the vehicle, and toward the left side and toward the right side of the vehicle. More precisely, the front $Z_{front}$ and rear $Z_{rear}$ angular sectors each extend to the front and to the rear of the vehicle, preferably symmetrically on either side of the longitudinal median axis X of the vehicle, the angular sector $Z_{left}$ extends from the left side of the vehicle between the front and rear angular sectors and the angular sector $Z_{right}$ extends from the right side of the vehicle between the front and rear angular sectors. As illustrated in FIG. 1, the radar beams Df_l and Df_r grouped within the angular sector $Z_{front}$ extending toward the front of the vehicle 10 are shown according to a first graphic code, the radar beams Dr_l and Dr_r grouped within the angular sector $Z_{rear}$ extending toward the rear of the vehicle 10 are shown according to a second graphic code, the radar beams Df_l and Dr_l grouped in the angular sector $Z_{left}$ extending toward the left side of the vehicle 10 are shown according to a third graphic code and the radar beams Df_r and Dr_r grouped within the angular sector $Z_{right}$ extending toward the right side of the vehicle 10 are shown according to a fourth graphic code. The radar beams thus distributed into these four angular sectors $Z_{front}$, $Z_{rear}$, $Z_{left}$, $Z_{right}$ allow new detection zones to be defined covering specifically the front, the rear, the left side and the right side of the vehicle, respectively.

The configuration of the four angular sectors may be adjusted by means of two adjustment parameters, allowing the extent of the front angular sector $Z_{front}$, and of the rear angular sector $Z_{rear}$ to be respectively adjusted. Thus, the front angular sector $Z_{front}$ has an angular extent defined by the angle α between the longitudinal median axis X of the vehicle and a radial edge of the front angular sector $Z_{front}$. Similarly, the rear angular sector $Z_{rear}$ has an angular extent defined by the angle β between the longitudinal median axis X of the vehicle and a radial edge of the rear angular sector $Z_{rear}$.

Then, for each of the four angular sectors thus defined, a selection of the radar beam which has the shortest range is subsequently made from amongst the radar beams distributed into each of them for which no target is detected.

$D_{front}$ thus denotes the beam having the shortest range from amongst the beams grouped within the angular sector $Z_{front}$ extending to the front of the vehicle, $D_{rear}$, the beam having the shortest range from amongst the beams grouped within the angular sector $Z_{rear}$ extending to the rear of the vehicle, $D_{left}$, the beam having the shortest range from amongst the beams grouped within the angular sector $Z_{left}$ extending from the left side of the vehicle and $D_{right}$, the beam having the shortest range from amongst the beams grouped within the angular sector $Z_{right}$ extending from the right side of the vehicle.

In a following step, the amplitude of the reflected beams, corresponding respectively to the beams selected within the four angular sectors, is detected and the period of time for which the amplitude of these beams is maintained with respect to a predefined time threshold for each angular sector, respectively, is analyzed. In other words, it is sought to verify whether, for each of the four angular sectors, the reflected amplitude of the selected beam which does not detect a target and has the shortest range is maintained for a minimum time corresponding to the predefined time threshold. If this is the case, it is considered that there is an immobile obstacle, which can typically be a stationary vehicle, for the angular sector in question. In this way, a traffic congestion situation is detected when the analysis step determines, simultaneously for the four angular sectors $Z_{front}$, $Z_{rear}$, $Z_{left}$, $Z_{right}$, that the period of time for which the amplitude is maintained is greater than or equal to the predefined time threshold for the corresponding angular sector.

For this purpose, as illustrated in FIG. 2, a module 30 for analyzing the period of time for which the amplitude of the selected beams is maintained with respect to values of predefined time thresholds may consist of a low-pass filter, whose time constant $T_i$ is of the same order of magnitude as the time threshold predefined for each angular sector $Z_i$ (i=front, rear, left, right). Thus, the low-pass filter 30 filters the selected beams having the shortest range whose reflected amplitude is maintained for a duration greater than or equal to the predefined time threshold for each angular sector being considered.

According to one preferred embodiment of the invention illustrated in FIG. 2, when it has been verified that the amplitude of the selected beams having the shortest range stays the same for a predefined time threshold, the idea is then to compare the range of each beam selected within the four angular sectors with a predefined distance threshold for each angular sector respectively. The information relating to this comparison for each angular sector $Z_i$, denoted Info_$Z_i$ (i=front, rear, left, right), which is preferably a Boolean value, is determined by a comparison module 40, by comparing, for each angular sector, the range of the selected beams previously filtered with at least one threshold. According to the exemplary embodiment in FIG. 2, two thresholds are used corresponding to a hysteresis function, as follows:

Info_$Z_i$=0 if the range of the beam selected for the corresponding angular sector is greater than a first low threshold $D_{down\ i}$ defined for the angular sector in question, or Info_$Z_i$=1 if said range is less than or equal to a second high threshold $D_{up\ i}$ defined for the angular sector in question and higher than the low threshold $D_{down\ i}$.

Alternatively, where the two thresholds are equal to a single distance threshold, then:

Info_$Z_i$=0 if the range of the beam selected for the corresponding angular sector is greater than the single distance threshold predefined for the angular sector in question, Info_$Z_i$=1 if said range is less than or equal to said threshold.

For example, this predefined distance threshold is fixed at less than or equal to 5 m, preferably equal to 3 m, for the angular sectors $Z_{front}$ and $Z_{rear}$ extending toward the front and toward the rear of the host vehicle 10. With regard to the angular sectors $Z_{right}$ and $Z_{left}$ extending from the right side and from the left side of the host vehicle 10, this distance threshold is for example fixed at less than or equal to 2 m, preferably equal to 1.5 m.

It is therefore considered that, if the range of the beam selected for an angular sector in question is below this threshold, there is an immobile obstacle corresponding to a stationary vehicle for this angular sector in the immediate vicinity of the vehicle.

The state of the Boolean values info_$Z_i$ thus determined by the comparison module 40 is used at the input of an AND gate 50, whose output TJD_Flag is used to validate the detection of a traffic congestion situation. Thus, if the condition on the comparison of the ranges of the selected beams with the predefined distance threshold is met simultaneously in the four angular sectors, the output signal TJD_Flag goes to 1, which allows the detection of a traffic congestion situation to be validated. This information on traffic congestion detection validation TJD_Flag is supplied at an enable input of a system for controlling the autonomous mode of the vehicle and, in particular, of a system for controlling the autonomous mode of the vehicle designed to operate at level 3 of autonomy, so as to activate this system. Given that the method just described allows a traffic congestion situation to be detected even when the surrounding vehicles are stationary, the availability of such a system is consequently significantly improved.

The invention claimed is:

1. A method for detecting a traffic congestion situation by a radar system equipping a host vehicle, said radar system comprising multi-beam radar sensors arranged at rear and front corners of the host vehicle and configured to emit radar beams in various given targeted directions in such a manner as to cover, for each radar sensor, a detection zone extending between a radial direction oriented obliquely toward a front of the host vehicle and a radial direction oriented obliquely toward a rear of the host vehicle, each radar sensor being configured to supply, for each given targeted direction, a range of a radar beam emitted in said direction, the method comprising:

distributing the radar beams emitted by the radar sensors according to a division of an environment of the host vehicle into four angular sectors, in opposing pairs, respectively extending toward the front and toward the rear of the host vehicle and toward a right side and toward a left side of the host vehicle;

selecting, for each of the four angular sectors, from amongst radar beams distributed into each angular sector for which no target is detected, a radar beam having a shortest range for which no target is detected;

detecting an amplitude of reflected beams corresponding respectively to said selected radar beams having the shortest range for which no target is detected for each of the four angular sectors;

determining a period of time for which an amplitude of said reflected beams is maintained; and detecting a traffic congestion situation when simultaneously for the four angular sectors, said period of time for which the amplitude is maintained is greater than or equal to a predefined time threshold for each angular sector.

2. The method as claimed in claim 1, wherein the analyzing further comprises comparing the range of each radar beam selected within the four angular sectors with a predefined distance threshold for each angular sector respectively and determining, simultaneously for the four angular sectors, whether said range is less than or equal to said predefined distance threshold.

3. The method as claimed in claim 2, wherein said predefined distance threshold is fixed at less than or equal to 5 m for angular sectors extending toward the front and toward the rear of the host vehicle.

4. The method as claimed in claim 2, wherein said predefined distance threshold is fixed at less than or equal to 2 m for angular sectors extending from the right side and from the left side of the host vehicle.

5. The method as claimed in claim 2, wherein said predefined distance threshold is fixed at less than or equal to 3 m for angular sectors extending toward the front and toward the rear of the host vehicle.

6. The method as claimed in claim 2, wherein said predefined distance threshold is fixed at less than or equal to 1.5 m for angular sectors extending from the right side and from the left side of the host vehicle.

7. The method as claimed in claim 1, further comprising activating an autonomous driving mode of the host vehicle when the traffic congestion situation is detected.

8. The method as claimed in claim 7, wherein said autonomous driving mode is designed to provide all operational driving tasks of the host vehicle.

9. A device for detecting a traffic congestion situation comprising a radar system on board a host vehicle, said radar system comprising multi-beam radar sensors arranged at rear and front corners of said host vehicle and configured to emit radar beams in various given targeted directions in such a manner as to cover, for each radar sensor, a detection zone extending between a radial direction oriented obliquely toward a front and a radial direction oriented obliquely toward a rear of the host vehicle, each radar sensor configured to supply, for each given targeted direction, a range of a radar beam emitted in said direction, the device comprising:

circuitry for processing the emitted radar beams configured to:

apply a distribution of all of the radar beams emitted by the radar sensors according to a division of an environment of the host vehicle into four angular sectors, in opposing pairs, respectively extending toward the front and toward the rear of the host vehicle and toward a right side and toward a left side of the host vehicle, select for each of said four angular sectors, from amongst radar beams distributed into each angular sector for which no target is detected, a radar beam having a shortest range for which no target is detected, said verify a period of time for which an amplitude of reflected beams corresponding respectively to said selected radar beams having the shortest range for which no target is detected for each of the four angular sectors, is maintained, and detect the traffic congestion situation when, simultaneously for the four angular sectors, said period of time for which the amplitude is maintained is greater than or equal to a predefined time threshold.

10. The device as claimed in claim 9, wherein the circuitry is further configured to compare the range of each radar beam selected within the four angular sectors with a predefined distance threshold for each angular sector respectively, and detect the traffic congestion situation when simultaneously for the four angular sectors said range is less than or equal to said predefined distance threshold.

11. The device as claimed in claim 9, wherein the circuitry is further configured to activate a system for controlling an autonomous mode of the host vehicle when the traffic congestion situation is detected.

12. An automobile vehicle comprising:
  the device according to claim 9.

* * * * *